United States Patent
Segasby et al.

(10) Patent No.: US 10,096,152 B2
(45) Date of Patent: Oct. 9, 2018

(54) GENERATING DATA FOR USE IN IMAGE BASED LIGHTING RENDERING

(71) Applicant: LIGHTMAP LIMITED, Leicester (GB)

(72) Inventors: Mark Simon Segasby, Leicester (GB); Simon Christopher Smith, Staple Hill (GB)

(73) Assignee: LIGHTMAP LIMITED, Leicester (GB)

( * ) Notice: Subject to any disclaimer, the term of this patent is extended or adjusted under 35 U.S.C. 154(b) by 153 days.

(21) Appl. No.: 15/067,869

(22) Filed: Mar. 11, 2016

(65) Prior Publication Data
US 2016/0196685 A1    Jul. 7, 2016

Related U.S. Application Data

(63) Continuation of application No. 12/729,150, filed on Mar. 22, 2010.
(Continued)

(51) Int. Cl.
*G06T 15/50* (2011.01)
*G06T 19/20* (2011.01)

(52) U.S. Cl.
CPC .......... *G06T 15/506* (2013.01); *G06T 19/20* (2013.01); *G06T 2200/04* (2013.01);
(Continued)

(58) Field of Classification Search
CPC .......... G06F 3/048; G06T 15/50; G06T 19/00
See application file for complete search history.

(56) References Cited

U.S. PATENT DOCUMENTS

| 7,385,725 B1* | 6/2008 | Sawyer ............... G06F 3/1207 358/1.18 |
| 2005/0128211 A1* | 6/2005 | Berger ................. G06T 19/00 345/582 |

(Continued)

OTHER PUBLICATIONS

Makoto Okabe, Yasuyuki Matsushita, Li Shen, Takeo Igarashi, Illumination Brush: Interactive Design of All-frequency Lighting, 15th Pacific Conference on Computer Graphics and Applications, Oct. 29, 2007, p. 171-180.*

(Continued)

*Primary Examiner* — Weiming He
(74) *Attorney, Agent, or Firm* — King & Schickli, PLLC (57) ABSTRACT

A method of generating data for use in image based lighting rendering, including displaying a 2-dimensional canvas (202), each point on the 2-dimensional canvas representing a surface co-ordinate of a 3-dimensional object having at least one surface. User input describing creation/modification of at least one shape (205, 205') having an associated lightness value for use in image based lighting rendering is received via the 2-dimensional canvas. The 2-dimensional canvas is updated in accordance with the user input to display a representation of the at least one shape as created/modified by the user input, the representation on the canvas being distorted to indicate mapping of the at least one shape with respect to at least one said surface of the 3-dimensional object. Data describing the at least one shape for use in graphics rendering is generated.

17 Claims, 7 Drawing Sheets

Related U.S. Application Data (60) Provisional application No. 61/165,609, filed on Apr. 1, 2009.

(52) U.S. Cl.
CPC ...... *G06T 2200/24* (2013.01); *G06T 2215/16* (2013.01); *G06T 2219/2021* (2013.01)

(56) References Cited

U.S. PATENT DOCUMENTS

| 2009/0027391 A1* | 1/2009 | Burley | G06T 15/04 345/426 |
| 2010/0077328 A1* | 3/2010 | Berg | G06F 3/0481 715/764 |

OTHER PUBLICATIONS

Paul Debevec , Image-based Lighting, Computer Graphics and Applications, IEEE, vol. 22, Issue 2, p. 26-34, 2002.*

* cited by examiner

GENERATING DATA FOR USE IN IMAGE BASED LIGHTING RENDERING

The present invention claims priority from U.S. provisional patent application Ser. No. 61/165,609, filed on Apr. 1, 2009.

FIELD OF THE INVENTION

The present invention relates to generating data for use in image based lighting rendering.

BACKGROUND TO THE INVENTION

Image based lighting is a known 3-dimensional rendering technique where an image, typically based on a high-resolution photographic image of a real environment or place, is used to surround a 3-dimensional model of an object, which is then rendered to create a scene where it appears that the object is located in the environment. Light and reflections from the image interact with the surfaces of the 3-dimensional model to create a realistic image.

Conventionally, the images used to create such scenes tend to be based on small sets of HDR images that are supplied with 3-dimensional rendering software applications, or ones that are purchased at extra cost, in sets or individually. The vast majority of such available images are aimed at the transport sector in order to visualise vehicles in different locations and so are of limited use to users wishing to produce different types of scenes. For instance, an image of an outside environment is unsuitable if a user wishes to produce images that look like studio photographs, e.g. visualisations of products or packaging for use in advertising. There are some commercially available HDR captures of studio lighting setups, but the disadvantage of these is that different combinations of view point and subject matter require totally different lighting positions. Purchasing fixed HDR images does not satisfy the requirements of those looking to create very high quality renders whilst being able to control exactly where light and reflections hit their subject. There is therefore a need for a more flexible means for creating data representing images suitable for image based lighting rendering.

SUMMARY OF THE INVENTION

Embodiments of the present invention are intended to address at least some of the abovementioned problems.

According to one aspect of the present invention there is provided a method of generating data for use in image based lighting rendering, the method including:

displaying a 2-dimensional canvas, each point on the 2-dimensional canvas representing a surface co-ordinate of a 3-dimensional object having at least one surface;

receiving user input via the 2-dimensional canvas describing creation/modification of at least one shape having an associated lightness value for use in image based lighting rendering;

updating the 2-dimensional canvas in accordance with the user input to display a representation of the at least one shape as created/modified by the user input, the representation on the canvas being distorted to indicate mapping of the at least one shape with respect to at least one said surface of the 3-dimensional object, and generating data describing the at least one shape for use in graphics rendering.

The data describing the updated 2-dimensional canvas may include a map projection, or image map, representing the at least one shape on the 2-dimensional canvas mapped onto at least one said surface of the 3-dimensional object.

The method may further include performing an image based lighting rendering process based on the data describing the updated 2-dimensional canvas and using the associated lightness value of each said shape. An image produced by the rendering process may be output in one of a selection of file formats.

The image map can be a low or high dynamic range image.

The updating of the 2-dimensional canvas can be performed substantially instantaneously upon the receipt of the user input, thereby effectively providing real-time updating of the canvas.

The 2-dimensional canvas may represent a total area of all or some of the surface(s) of the 3-dimensional object.

The user input can describe modification of properties of the at least one shape, the properties being selected from a set including: position of a said shape with respect to at least one said surface of the 3-dimensional object; orientation of a said shape with respect to at least one said surface of the 3-dimensional object; area/extent of a said shape with respect to the surface(s) of the 3-dimensional object. A said shape may represent a light source for use in a graphical rendering process and the properties of the light source can include colour of light projected the light source, or level of lightness projected by the light source. The representation of the light source may be generated by a synthetic light generation algorithm/model, or the representation of the light source may be an image of a real-world light source, e.g. a photograph of a lamp. A said shape can be regular (e.g. quadrilateral, circular, hexagonal) or irregular, e.g. have a user-defined number and arrangement of sides for its outline.

The user input can describe modification of properties of a canvas background, e.g. exposure level.

According to another aspect of the present invention there is provided a system for generating data for use in image based lighting rendering, the system including:

a display configured to display a 2-dimensional canvas (202), each point on the 2-dimensional canvas representing a surface co-ordinate of a 3-dimensional object having at least one surface;

a user input device configured to receive user input via the 2-dimensional canvas describing creation/modification of at least one shape having an associated lightness value for use in image based lighting rendering;

a processing component configured to:
update the 2-dimensional canvas in accordance with the user input to display a representation of the at least one shape as created/modified by the user input, the representation on the canvas being distorted to indicate mapping of the at least one shape with respect to at least one said surface of the 3-dimensional object, and
generate data describing the at least one shape for use in graphics rendering.

According to another aspect of the present invention there is provided a computer program product comprising a computer readable medium, having thereon computer program code means, when the program code is loaded, to make the computer execute a method of generating data for use in image based lighting rendering substantially as described herein.

According to another aspect of the present invention there is provided data for use in image based lighting rendering using a method/system substantially as described herein and/or use of such data in image based lighting rendering.

According to yet another aspect of the present invention there is provided a user interface method including:

providing a mapping between co-ordinates on at least one surface of a 3-dimensional object and corresponding co-ordinates on a 2-dimensional representation of the at least one surface;

receiving data representing a shape and at least one associated property, the shape having a position defined in terms of the co-ordinates of the 2-dimensional representation;

using the mapping to produce a distorted representation of the shape, and displaying the distorted representation of the shape on the 2-dimensional representation.

The step of using the mapping can include transforming the position co-ordinates of the 2-dimensional representation to corresponding said co-ordinates on at least one said surface of the 3-dimensional object. The step of receiving data may include a user placing or re-positioning the shape on the 2-dimensional representation and the step of displaying the distorted representation of the shape may be performed in an apparently simultaneous manner to the user, thereby effectively providing real-time placing/re-positioning and displaying of the distorted shape.

According to a further aspect of the present invention there is provided a user-interface including:

a display including a 2-dimensional canvas, each point on the 2-dimensional canvas representing a surface co-ordinate of a 3-dimensional object;

at least one input component for receiving user input describing creation/modification of at least one shape having an associated lightness value, wherein the 2-dimensional canvas is updated in accordance with the user input to display a representation of the at least one shape as created/modified by the user input, the representation on the canvas being distorted to indicate mapping of the at least one shape with respect to at least one said surface of the 3-dimensional object.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

BRIEF DESCRIPTION OF THE DRAWINGS

The invention may be performed in various ways, and, by way of example only, embodiments thereof will now be described, reference being made to the accompanying drawings in which.

DETAILED DESCRIPTION OF THE DRAWINGS

Figure 1:
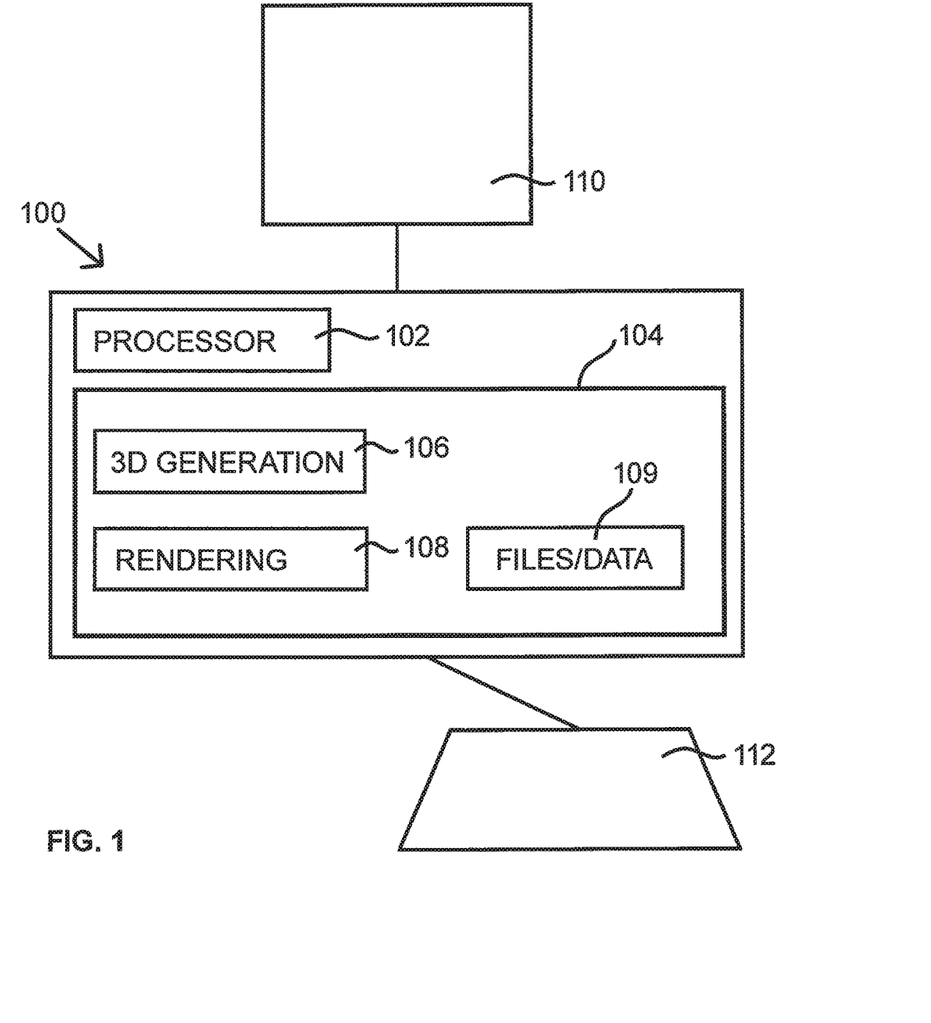
FIG. 1 is a block diagram of a computing device configured with an application for generating data describing a 3-dimensional object having at least one surface.

Referring to FIG. 1, a computing device 100 includes a processor 102 and internal memory 104. The internal memory includes an application 106 for creating data representing a 3-dimensional image. In the example the memory also includes a rendering application 108 that receives the data representing the 3-dimensional image that has been created using the application 106 (typically in the form of at least one file 109 saved in a suitable format, such as .EXR or .HDR), and then processes the data to produce a rendered image of a 3-dimensional object modelled in the rendering application. Examples of rendering/visualisation applications include: HyperShot produced by Bunkspeed; Maxwell Render produced by Next Limit; Fry Render produced by Random Control, and Maya, 3D Studio Max, Alias Studio and Showcase produced by Autodesk, but it will be understood that others can be used. In an alternative embodiment, the applications 106 and 108 may be effectively combined. In this case, the data describing the 3-dimensional image need not be saved as a stand-alone file, but can be stored temporarily in the internal memory for use by the combined application that also performs the rendering. Further, the rendering application 108 may function as a plug-in for another application.

The computing device 100 is connected to a display device 110, e.g. an LCD screen, and at least one input device, such as keyboard 112. It will be understood that the arrangement of FIG. 1 is exemplary only and the computer 100 can comprise any suitable known machine that is capable of executing a software application and that other types of input devices, such as a mouse, trackball and/or graphics tablet, could be used in combination with it.

Figure 2:
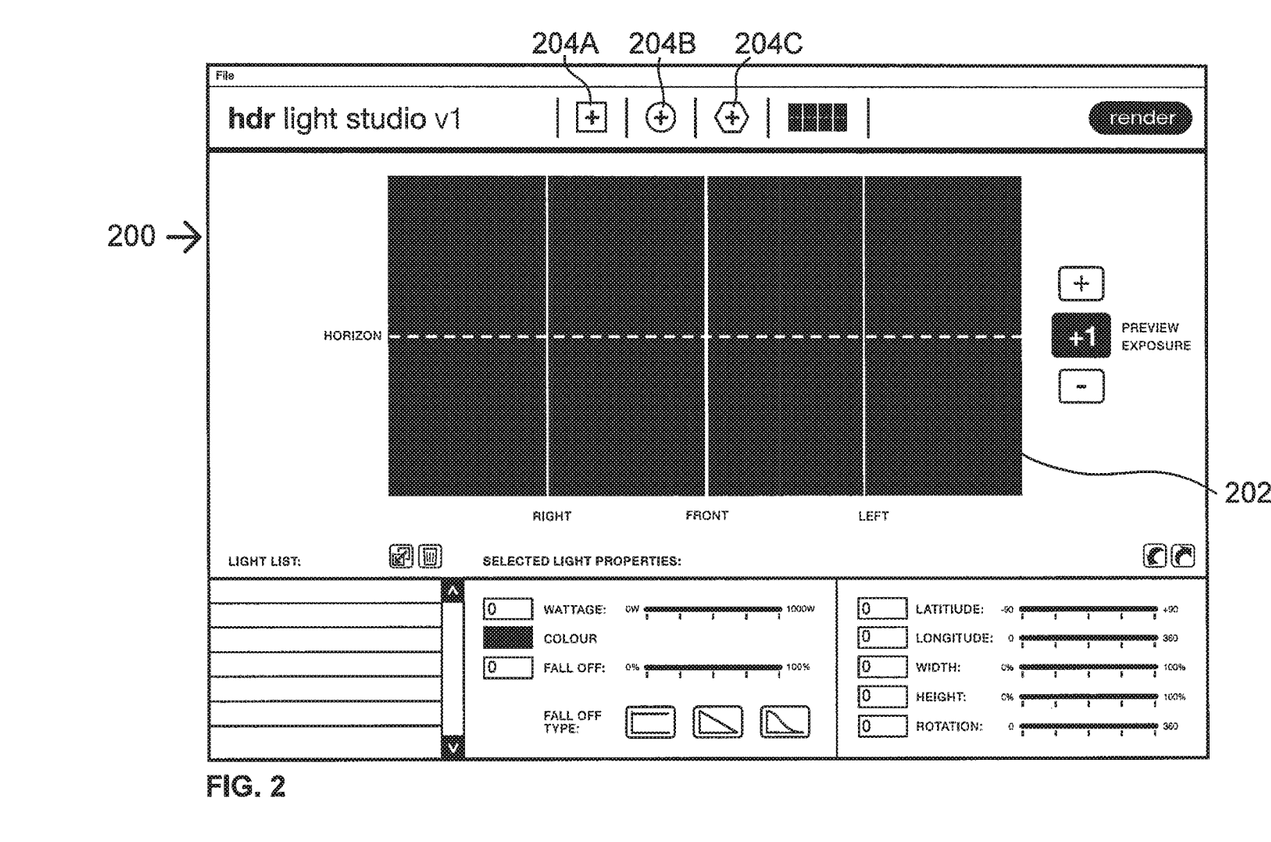
FIGS. 2-4 are examples of screen displays produced by the application.

FIG. 2 shows an example initial display/user-interface 200 generated on screen 110 as the image data creation application 106 is executed on the computing device 100. The display includes a main canvas area 202. The canvas area 202 is rectangular in shape and is divided into a grid having four columns and two rows. In the example, the canvas area is a 2-dimensional representation of an inner surface of a 3-dimensional sphere. The horizontal grid line of the canvas area represents the equator of the sphere and the four vertical guide lines represent the front, left, right and back of the 3D environment and are spaced 90 degrees apart and meet at the poles. The grid lines are colour coded onscreen. The X and Y axes of the canvas are mapped onto the spherical longitude and latitude co-ordinate system from 0 to 360 degrees in longitude along the X-axis of the canvas, and along −90 to 90 along the Y-axis. For example, the position 0,0 (top left of the canvas) represents the location −90 depress latitude, 0 degrees longitude, and the centre of the canvas represents 180 degrees longitude and 0 degrees latitude. Thus, the 2-dimensional canvas area 202 represents and displays the entire area of the inner surface of the sphere, with each (X, Y) co-ordinate/point on the canvas corresponding to a longitude/latitude on the surface of the sphere. In alternative embodiments, only part of the entire area/surface(s) of the 3-dimensional object may be shown on the canvas at any particular time. It will also be understood that the application 106 can be configured to generate data describing any 3-dimensional shape for rendering purposes. For example, instead of a sphere map, data describing a cube map can be generated. In this case, the user interface may include an additional option for selecting the type of 3-dimensional object/map.

Figure 3:
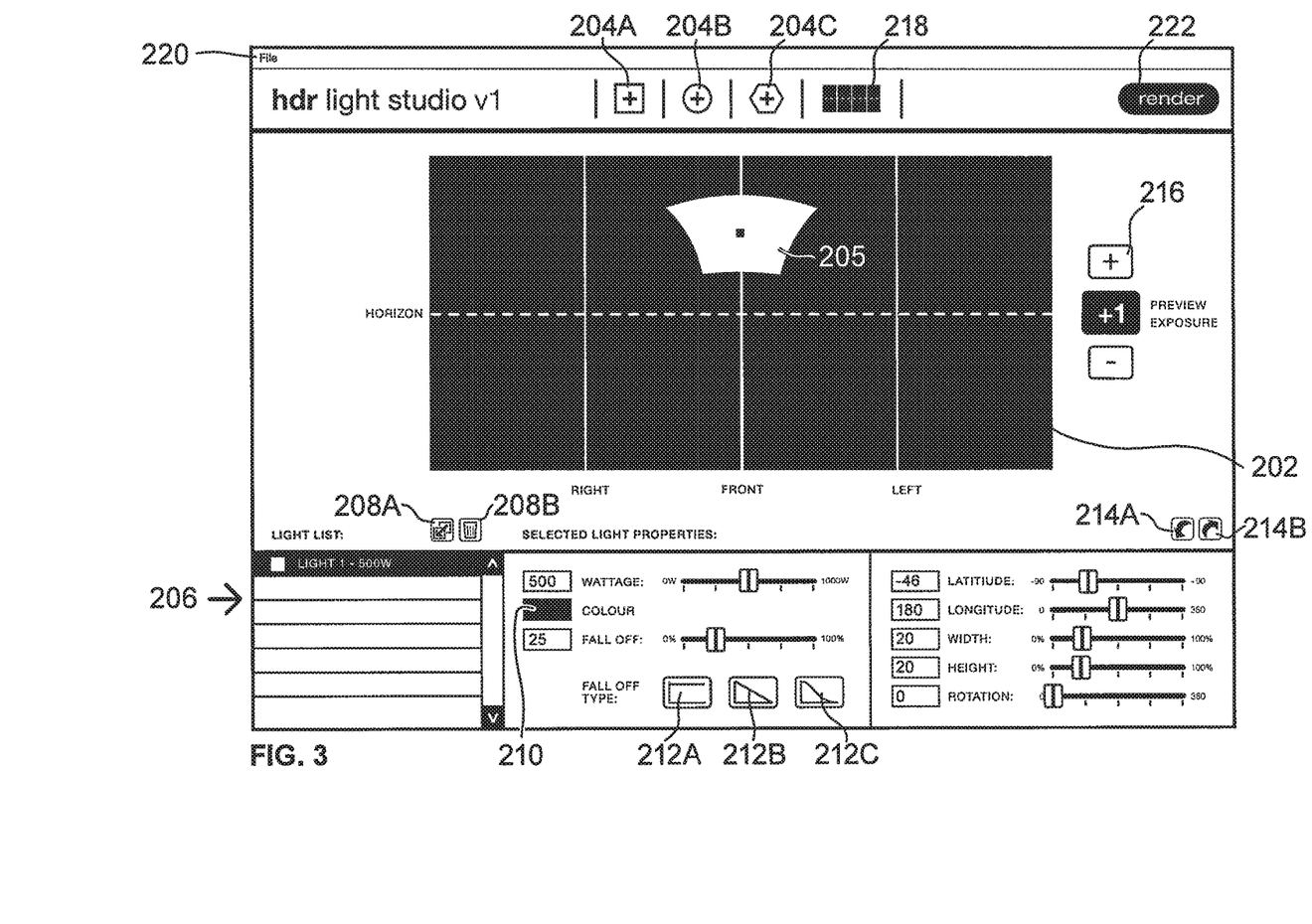

The user interface of FIG. 2 further includes a selection of shapes 204A, 204B, 204C that represent shapes of light sources/lamps that will be used by the rendering application. In the example the shapes include a square/quadrilateral, a circle and a hexagon, but it will be understood that other shapes, including user-defined/irregular ones, can be made available. When the user selects one of the shapes 204A-204C (using a conventional pointer/cursor) a representation of a light source having that shape appears on the canvas 202, initially in a central position. The user can then click/drag (or point/click) the representation around the canvas 202 to change its position (with the shape being shown in dotted outline during such dragging for computational efficiency). Turning to FIG. 3, an example display where a user has selected the square shape 204A and then dragged the representation 205 upwards on the canvas is shown. The sliders at the bottom right-hand corner of the window indicate the position of the representation with respect to the surface of the sphere in terms of latitude and longitude. The position of the representation can be modified by using the Latitude and Longitude sliders as well as by dragging it over the canvas.

As can be seen, the representation 205 of the square-shaped light source is distorted to represent the mapping of the shape with respect to the inner surface of the sphere. The position of the shape is such that it is tangential to the surface of the sphere, with the midpoint of the shape "touching" the sphere surface. In the illustrated example the shapes are flat/planar; however, non-planar shapes may also be provided, where the surface of the shape is effectively curved around the surface of the sphere (in a practical implementation of such a version, several flat shapes may be used to represent/approximate a curved shape, although perfect curved nodes may be described mathematically and an alternative suitable rendering technique to the one described herein may be used in that case). This allows for bands of light to travel around the sphere during a rendering process (a planar surface can only ever light half of a sphere and only then when its area is hypothetically infinite).

Figure 4:
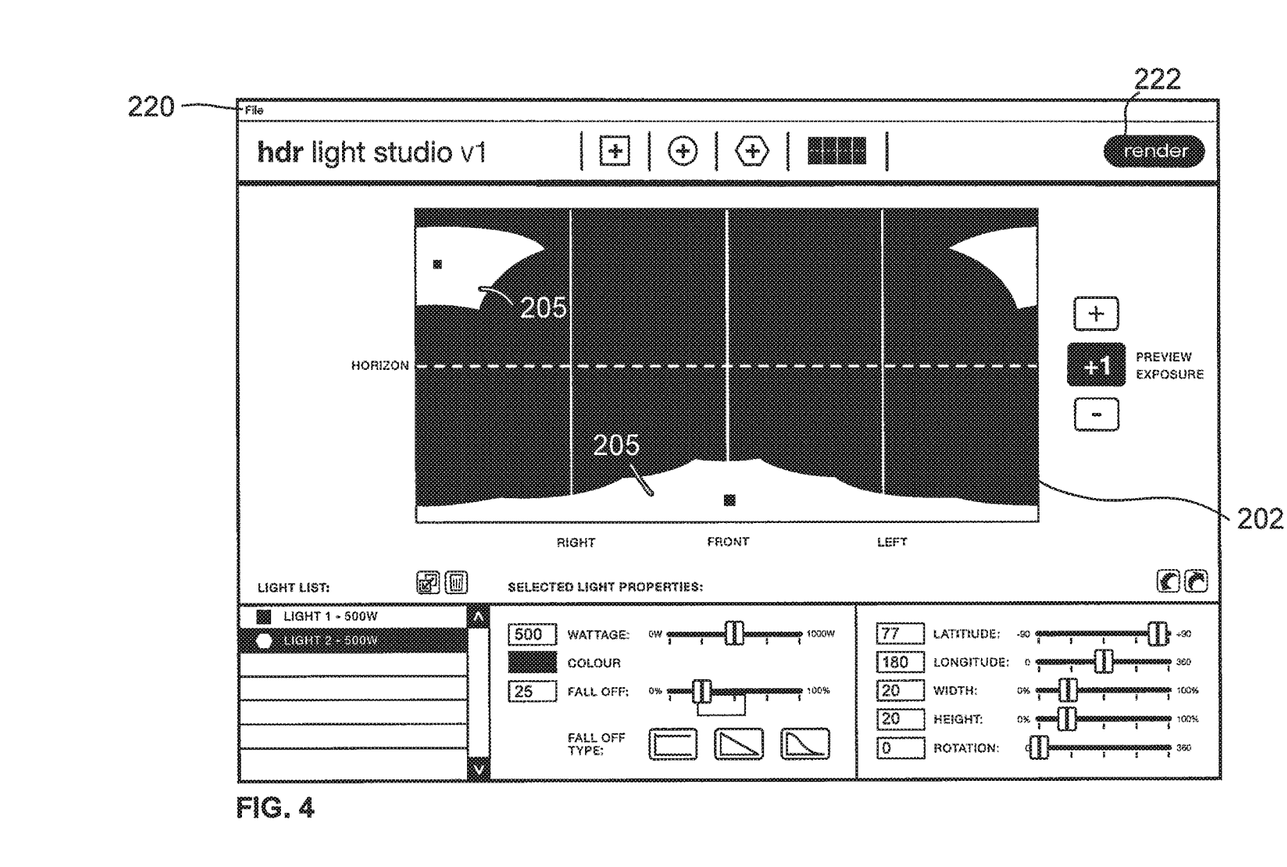

In FIG. 4, the representation 205 has been moved to the left-hand side of the canvas and a portion of it wraps around to the right-hand side. FIG. 4 also shows a second representation 205' that has been added by the user. The second representation is of a hexagonal light source positioned towards the bottom of the canvas. The distortion of the shapes to represent their positioning on the sphere is performed in an at least apparently real-time manner, that is, the distorted shape is displayed in position on the canvas substantially simultaneously/instantaneously with when user input describing re-positioning of the shape is received. The application 106 also stores data that describes the 3-dimensional sphere corresponding to the 2-dimensional canvas being "drawn" by the user. In some embodiments, that 3-dimensional data can also be updated in a substantially real-time manner as the user modifies the onscreen representation of the sphere (e.g. with a representation of at least part of the 3-dimensional object being updated on a different part of the screen as well as the 2-dimensional canvas), although it will be appreciated that this is optional.

The size/area/extent of the representation 205 can be altered by using the Width and Height sliders at the bottom right-hand corner of the window. The units shown in the boxes to the left of these two sliders are relative to the co-ordinate system that is used. In embodiments where a sphere map is being used that sphere can have a notional radius of 1 unit and so a shape having a width of 100% on the canvas can represent a one that is 2 units wide, i.e. 100% greater (and a height of 100% represents a shape that is 2 units tall). The representation 205 can also be rotated using the Rotation slider. The representation initially has a notional rotation of 0°, but moving the Rotation slider to the right effectively rotates the representation about a central axis perpendicular to the surface of the sphere, anywhere up to 360°, and moving the slider back to the left decreases the angle of rotation.

When the user selects one of the shapes 204A-204C, the selected shape/light source is added to a list 206 at the bottom left-hand corner of the window. When more than one light source has been added to the canvas area (as in FIG. 4), it is possible to select which one is to be modified by clicking on the appropriate entry in the list. The interface also includes a button 208A for creating a copy of the currently-selected light source and a button 208B for deleting the selected light source.

The entry for each light source in the list 206 includes an indication of its lighting/brightness in terms of wattage, although it will be understood that other units could be used. Properties of the light associated with the representation can be modified using the user interface components below the "Selected Light Properties" text. The wattage can be altered by using the Wattage slider, which, in the example, offer a wattage in the of 0-1000 W, but it will be understood that this can be varied to give a higher upper end and/or a negative lower end (in which case the "light source" will effectively add/create darkness in the rendered image). The colour of the light can be changed by clicking on the colour box 210, which brings up a palette box from which the user can select from a range of standard or custom colours. The type of fall off of the light (i.e. how the lightness varies from the centre of the light source/bulb to its outer edge(s)) can be selected. The Fall Off slider can be used to set the percentage brightness at the outside edge of the light and the interface also includes three buttons 212A-212C for controlling how the light falls off from the centre of the light source represented by the shape. Button 212A represents no fall off at all and so a light source of this type comprises a consistent block of lightness/brightness, i.e. stays at the maximum wattage from its centre through to its edge(s). Button 212B represents a linear fall from the maximum wattage at the centre of the light source to a minimum value at its edge (scaled to each axis). Button 212C represents a cosine fall off with brightness tailing off, i.e. can have the same centre and minimum edge values as the linear fall off, but the fall off follows a cosine curve rather than a linear one. It will be appreciated that other types of fall off can be set, e.g. user-defined in terms of how lightness falls off with distance from the centre point, and whether that fall off is radial or not.

The user interface also includes undo and redo buttons 214A, 214B, which allow one or more editing steps to be cancelled/re-done in a manner that will be familiar to the skilled person. Also included in the user interface is a Preview Exposure selection area 216 and a Background Synthesis button 218. As the 2-dimensional workspace represents a HDR image but is being displayed on an LDR display (0-255) it is useful to allow the user to change the brightness/exposure when viewing the workspace to see the full range of brightnesses represented. Area 216 allows the user to show a "window" on these values. Values outside that range are clipped to 255 (i.e. they are saturated) and the user interface offers +/−9 "stops", which allows it to show a sliding window over the whole range of HDR values. The Background Synthesis button 218 allows users to create a gradient comprising colour and brightness values from the top to the bottom of the sphere. This enables the creation of a graduated environment to supplement to individual light sources and allows for sophisticated effects to be generated like fake skies and ground or to add ambient lighting levels. Thus, the Background Synthesis button allows the user to create a colour ramp that is mapped to the latitude axis (vertical on the image map). The user can set colour pins on the ramp control and the system interpolates between the colours using a cosine multiplier between the RGB values. The user can also exercise similar control over the luminosity, which has a range of values of 0 to 1, which are then multiplied by the peak wattage value, and then by the RGB values to create a HDR colour value that can be rendered in the background. The contribution of lightness from light sources drawn on the canvas can then be added on top of these background values.

A File menu 220 allows the user to save data describing the shapes (and associated properties) as created on the canvas. Typically, the saved data will include all the values for each shape that the user can alter by means of the user interface, as well as background gradient parameters and the last-exported render details (see below), but it will be understood that variations are possible, e.g. data describing the shape with respect to the surface of the canvas 202, or with respect to a surface of the 3-dimensional object. The menu also allows loading of previously-saved data and an option to exit the application.

The user interface also includes a Render button 222, which initiates processing of the data created using the 2-dimensional canvas 202 to a generate data describing a sphere map. Selecting the button allows a user to set a file name/path for the output file, as well as select other options, such as the resolution of the rendered image and whether guide lines corresponding to the grid lines on the 2-dimensional canvas 202 are to be included in the output image. A range of resolutions can be provided so that a user can select a lower one to carry out a "quick preview" of the resulting image using the rendering application 108 instead of having to wait longer for a higher-resolution image to be created. The output will be a file including data describing the sphere map (or any other type of map, e.g. a cube map) in a format, e.g. .EXR or .HDR, suitable for use with the rendering application, which uses it as a sphere map for image-based lighting and reflections rendering of 3-dimensional model.

The output can comprise a high dynamic range (HDR) image that includes data that is intended to correspond to the physical values of luminance or radiance observable in the real world. A HDR image uses a higher number of bits per color channel than conventional digital images, e.g. to represent luminance values between $10^{-4}$ and $10^8$, or more. However, it will be understood that the output need not necessarily include a HDR image; it may can a low dynamic range image that defines brightness values between 0 and 255, or any other desired image description data.

The skilled person will understand that the screen display/user-interface shown in the Figures is exemplary only and that many variations to its arrangement and content are possible. For example, sliders could be replaced by menu options/dialogue boxes; some of the features, e.g. numerical indications of latitude/longitude, could be omitted, etc.

Figure 5A:
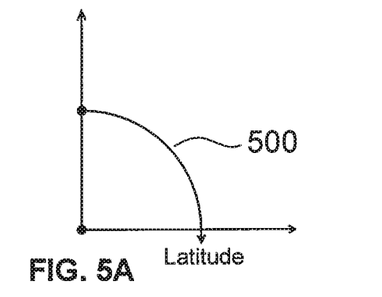
FIGS. 5A-5E illustrate schematically elements of graphical rendering processes.
Figure 5B:
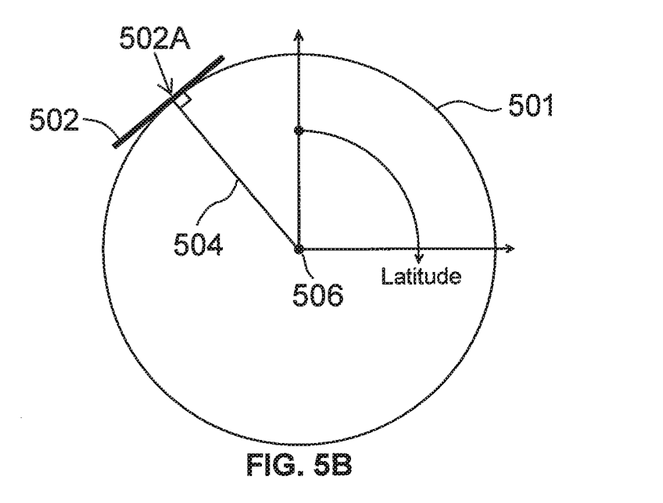

Information describing how the graphical rendering based on shape(s)/light source(s) created by a user on the 2-dimensional canvas 202 can be performed will now be given. FIG. 5A illustrates schematically an angle 500. For ease of illustration, the description below relates to two dimensions, with the angle 500 corresponding to a latitude co-ordinate on a sphere, but the skilled person will be able to apply the method for 3-dimensional representations using both longitude and latitude. A node (i.e. a shape/representation of a light source) is defined as being at unit distance from the origin 506 of a sphere. FIG. 5B illustrates a surface 502 of a node as being perpendicular to a vector 504 from the origin 506 of the sphere 501. The surface is limited in extent and the centre point 502A of the node is of unit distance from the origin. In the Figure the node is the line tangent to the unit sphere. The position of the node can be described in terms of latitude (about 315 degrees in the example).

Figure 5C:
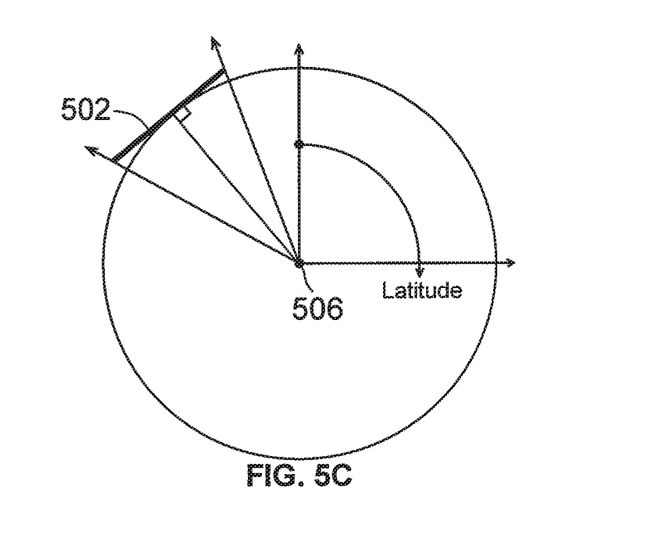
Figure 5D:
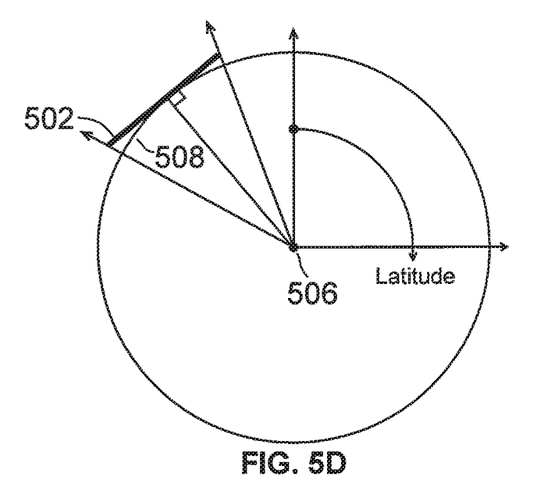

Turning to FIG. 5C, during the rendering process a computation simulating a ray of light being fired from the origin 506 outwards to infinity at a specific angle is performed. Some rays will intersect the node surface 502 and some will miss. If a ray hits the node surface then the colour and luminosity at that point on the node surface is extracted, either mathematically as a function of the position of the ray on the node surface, or as a sample of a real world HDR light source image. This colour is then mapped back to the location on the sphere where the ray intersects it (see bold arc 508 in FIG. 5D), which in turn maps onto the 2-dimensional mapping via the sphere intersections' latitude and longitude coordinates. The skilled person will be familiar with algorithms and code/routines for performing the necessary rendering processes. An example can be seen at the website: local.wasp.uwa.au/~pbourke/geometer/cliplinetopoly, for instance. It is also within the capability of the skilled person to implement the rendering process for 3-dimensional shapes other than spheres. As the canvas 202 in the example user interface is based on a sphere map, the lines of interception are projected onto a sphere, see bold arc 508 in FIG. 5C, which coincides with the unit sphere.

The result of the computation will normally comprise a set of colour values at various latitudes and longitudes on the sphere. These can then be mapped directly onto the 2-dimensional canvas where the x-axis represents longitude and the y-axis represents latitude. It will be appreciated that data describing the relationship between the surface of the canvas and the surface of the sphere as described above can be used for this purpose. As the size of the canvas is known, rays for testing for interceptions are selected so that one is fired for a longitude and latitude value that represents each pixel/X, Y co-ordinate on the canvas. Usually, only a single ray need be "fired" for each pixel on the canvas and intercepted with all the nodes created by the user to create a complete image of the node(s)/shape(s) on the canvas.

Figure 5E:
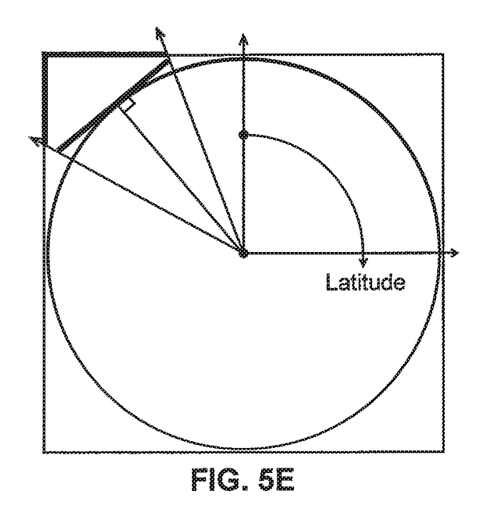

Turning to FIG. 5E, if a cube map is being produced rather than a sphere map then similar computations relating to interception of rays and a cube are performed. This is normally done when rendering the image because the user interface can remain as a sphere map. It will be appreciated that these techniques can be extended to other shapes.

As the canvas 202 represents a sphere map, an efficient implementation of the rendering process can be used for effectively updating the canvas onscreen in "real-time" as the user alters the shapes on it (although variations are possible, e.g. the shape is dragged around the screen in un-distorted form and is only displayed distorted when it is "dropped" by the user). When the Render button 222 is pressed, a similar rendering process can be performed, except that a known super-sampling technique is used in order to smooth the values between pixels.

FIGS. 6A-6D elaborate further on how a shape/node is created, instanced and processed. The example given is for a rectangular node in combination with a sphere map, but it will be apparent to the skilled person that the techniques can be modified for use with other shapes and/or 3-dimensional object maps.

Figure 6A:
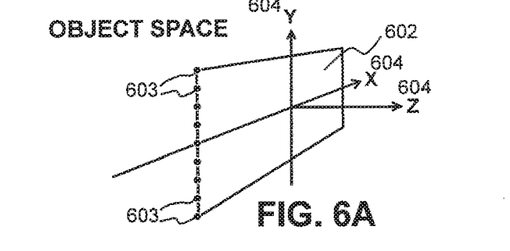
FIGS. 6A-6D illustrate schematically further elements of graphical rendering processes.

FIG. 6A outlines what is termed the "Object Space" of the node/shape. A rectangular shape 602 is created in object space when the user selects the appropriate button 204A in the user interface and is given a default central position on the canvas 202. There is a set of 256 points around the perimeter of the shape, but for ease of illustration only nine of these points 603 on one side of the shape are shown in FIG. 6A. The outline of the shape lies on two object space axes 604X, 604Y, with the third axis 604Z being perpendicular to the shape's main face.

Figure 6B:
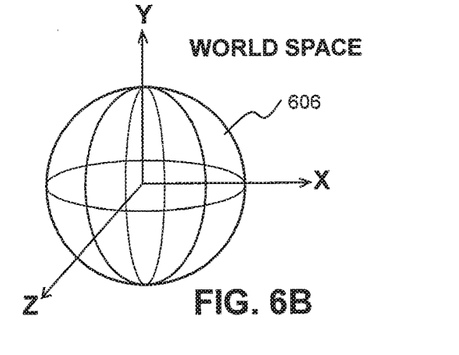

A unit sphere is used in calculating interceptions of rays for the creation of the sphere map represented by the canvas 202 is held in what is termed "World Space" and is shown diagrammatically at 606 in FIG. 6B. Using standard mathematical matrix transformations, it is possible to transform points between Object Space and World Space. In the illustrated example, this is done to translate a representation of the rectangle 602 from Object Space to World Space. When the instance of the node/shape is created, the points of the shape are transformed from Object Space into World Space using a single matrix representing rotation, translation, and scaling. In the example, the plane of the shape is always kept perpendicular to the outer surface of the sphere, and thus one of the axes 604Z always points towards the centre of the sphere 606.

Figure 6C:
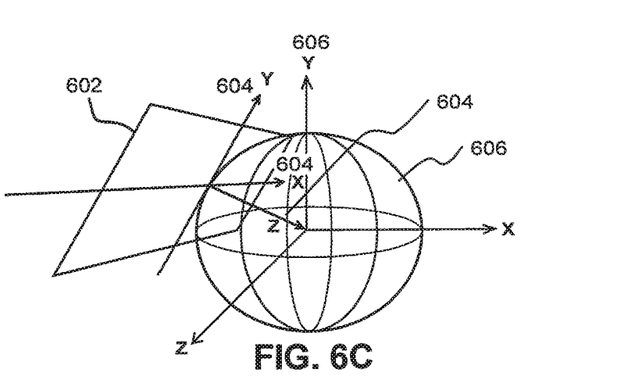

FIG. 6C shows the shape 602 in World Space, but with the Object Space axes overlaid to show axis 604Z pointing towards the centre of the sphere 606.

Figure 6D:
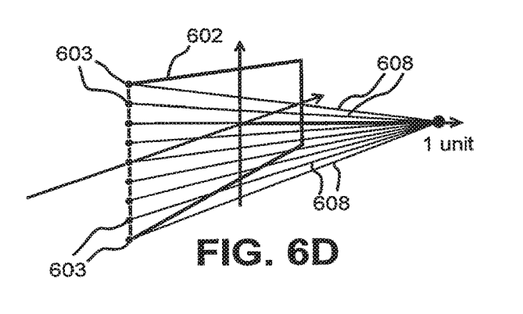

The application 106 then creates a set of vectors in Object Space that intersect each of the 256 points of the shape 602 and a point on the 604Z axis one unit along, which corresponds to the centre of the unit sphere. FIG. 6D shows rays 608 from the sample points 603 converging on the 604Z axis at unitary distance. These rays are used to display the dotted outline of the shape (called "outline vectors") as the user moves the shape on the canvas 202 as will now be described below.

When the user updates a property of the shape using the interface the following information is extracted: the scaling of the shape with respect to the x and y axis of the shape, and the location of the node in latitude/longitude coordinates (with respect to the coordinates of the canvas 202). This information is used to create a transformation matrix to transform the shape from Object Space to World Space (called the "World Matrix"). The inverse of this transformation (called the "Inverse World Matrix") is then calculated to allow transformation of points from World Space into Object Space. Each Outline Vector in Object Space is multiplied by the World Matrix to transform it into World Space, and a line/sphere intersection test is performed with this transformed line against the unit sphere using standard vector mathematics (such as outlined in mathematical and code form at the website: local.wasp.uwa.edu.au/~pbourke/geometry/sphereline/). Each interception point is then converted from World Space coordinates into the Latitude and Longitude coordinate system of the sphere 606 (where Longitude runs around the XZ plane and latitude runs from the positive Y-axis 606Y downwards). This latitude and longitude can then be displayed as a point on the canvas by scaling the longitude along the X-axis and latitude along the Y-axis.

Once the user has finished modifying the shape using the interface (typically signified by the mouse button being released to effectively "drop" the shape on the canvas), the entire canvas 202 can be updated to reflect the new layout as specified by the user. The process described below is used for both this updating of the canvas, as well as the "final" render process that takes place when button 222 is selected. The main difference is that in the final render Supersampling (see, for example, the website: en.wikipedia.org/wiki/Supersampling) and using a grid algorithm of 9 points for every final pixel is used.

The process is run in two passes, and can be split over multiple processors (if present) with each processor handling a range of latitudes split evenly between them. This can maximise processor power and can minimise execution time. A lookup table of mappings from X and Y coordinates to latitude and longitude is calculated once and used throughout for fast translation between the two coordinate systems.

The first pass creates the background and for each vertical pixel on the canvas 202, the colour from the background gradient (which the user can set using interface button 218) is calculated as follows:
- The background is defined as specific colours at key points along a line
- This line represents the entire range of latitude angles from −90° to +90°
- Values between the key colours are interpolated using cosine interpolation
- The pixel's Y value is converted to a location along this line and the colour is interpolated accordingly
- This colour value is multiplied by the luminosity value, which is also interpolated between key values like in the colour ramp, but from values lying in the range of 0 (represented by black) to 1 (represented by white), and then multiplied by the Peak Wattage of the shape (node/light source) being processed in order to give a final HDR value
- This value is written across the entire row of the final image/canvas In the second pass the components of each node are added to this background gradient and for each node in turn the following steps are performed for each X, Y location on the resulting image being generated:
- Translate the pixel position from X, Y into Latitude/Longitude using the lookup table
- Convert the Latitude/Longitude into a World Space coordinate
- Create a ray from the origin through the Latitude/Longitude location in World Space
- Multiply this ray by the shape's Inverse World Matrix to move it into Object Space
- Locate the interception, if any, of this ray with the XY plane in Object Space
- If the ray does intercept, a check if performed to see if it crosses it inside the outline of the shape as defined by the perimeter points 603
- This can be performed using the MacMartin crossing test (see, for example, the website: tog.acm.org/editors/erich/ptinpoly/, or Haines, Eric, "Point in Polygon Strategies," *Graphics Gems IV*, ed. Paul Heckbert, Academic Press, p. 24-46, 1994)
- If the test indicates that there is an interception then the luminosity at this point is calculated
- In this example, the falloff of the shape/light source is radial from the centre of the shape, from its maximum wattage value to minimum value, with cosine interpolation The luminosity is thus calculated and multiplied by the colour value of the shape (as set by the user using interface button 210)

This colour value is then written (additively) to the colour currently stored in the image data at the X and Y location with which the pass started for this ray.

The invention claimed is:

1. A method of generating image data for use in image based lighting rendering, the method including:
displaying a user interface, separate from and communicably coupled to a displayed three-dimensional scene to be rendered in an image based lighting process, the user interface being in the form of a two-dimensional canvas representing an inner surface of a three-dimensional volume surrounding the three-dimensional scene to be rendered, each point on the two-dimensional canvas representing a surface coordinate of the three-dimensional scene to be rendered in the image based lighting rendering and corresponding to a longitude/latitude on said inner surface of said three-dimensional volume, said displayed two-dimensional canvas adapted to include at least one two-dimensional shape having an associated lightness value, said shape being distorted within said displayed two-dimensional canvas to define an undistorted representation thereof in said three-dimensional scene;
receiving, via a computer, user input via interaction with said displayed two-dimensional canvas, said user input describing creation of the at least one two-dimensional shape having an associated lightness value or modification of said at least one two-dimensional shape within said displayed two-dimensional canvas;
using the computer to update the displayed two-dimensional canvas in accordance with the user input to display said two-dimensional canvas including said created/modified at least one two-dimensional shape distorted within said displayed two-dimensional canvas to define an undistorted representation thereof within said three-dimensional scene; and
using the computer to generate the image data describing the distorted representation of the at least one two-dimensional shape for use in graphics rendering of the three-dimensional scene, wherein said image data is lighting image data derived from said displayed two-dimensional canvas including said created/modified at least one two-dimensional shape, and said at least one shape is representative of a light source included in said lighting image data and for use in a graphical rendering process.

2. A method according to claim 1, wherein the image data describing the distorted representation of the at least one two-dimensional shape and derived from said displayed two-dimensional canvas includes a map projection representing the at least one two-dimensional shape within the displayed two-dimensional canvas mapped onto at least a portion of said three-dimensional scene, or an image map.

3. A method according to claim 2, wherein the image map comprises a high dynamic range image.

4. A method according to claim 1, further including performing an image based lighting rendering process based on the data describing the distorted representation of the at least one two-dimensional shape and using the associated lightness value of each said shape.

5. A method according to claim 4, wherein an image produced by the rendering process is output in one of a selection of file formats.

6. A method according to claim 1, wherein the step of updating the displayed two-dimensional canvas is performed substantially instantaneously upon receipt of the user input.

7. A method according to claim 1, wherein the displayed two-dimensional canvas represents a total area of all or at least a portion of said three-dimensional scene.

8. A method according to claim 1, wherein the user input describes modification properties of the at least one two-dimensional shape, the properties being selected from a set including: position of a said shape with respect to at least a portion of said three-dimensional scene; orientation of a shape with respect to at least a portion of said three-dimensional scene; area/extent of a said shape with respect to said three-dimensional scene.

9. A method according to claim 8, wherein the properties of said light source include colour of light projected by said light source or level of lightness projected by said light source.

10. A method according to claim 9, wherein the representation of said light source is generated by a synthetic light generation algorithm/model.

11. A method according to claim 9, wherein the representation of the light source includes an image of a real-world light source.

12. A method according to claim 1, wherein a said shape has a user-defined number and arrangement of sides for its outline.

13. A method according to claim 1, wherein the user input describes modification properties including exposure level of a background upon which at least a portion of said three-dimensional scene is displayed.

14. The method of claim 1, wherein the two-dimensional shape being distorted within said displayed two-dimensional canvas comprises the user dragging or moving the shape within the two-dimensional canvas from a first position to a second position, and further comprises altering the shape from a first configuration to a second configuration within the two-dimensional canvas.

15. A system configured to generate image data for use in image based lighting rendering, the system including:
a display configured to display a three-dimensional scene to be rendered and a separate two-dimensional canvas, the two-dimensional canvas representing an inner surface of a three-dimensional volume surrounding the three-dimensional scene to be rendered, each point on the two-dimensional canvas representing a surface coordinate of the three-dimensional scene to be rendered in the image based lighting rendering and corresponding to a longitude/latitude on said inner surface of said three-dimensional volume, said displayed two-dimensional canvas adapted to include at least one two-dimensional shape having an associated lightness value for use in image based lighting rendering, said shape being distorted within said displayed two-dimensional canvas to define an undistorted representation thereof in said three-dimensional scene;
a user input device configured to receive user input via interaction with said displayed two-dimensional canvas, said user input describing creation of the at least one two-dimensional shape having an associated lightness value for use in image based lighting rendering or modification of said at least one two-dimensional shape within said displayed two-dimensional canvas;
a processing component configured to:
update the displayed two-dimensional canvas in accordance with the user input to display said two-dimensional canvas including said created/modified at least one two-dimensional shape distorted within said displayed two-dimensional canvas to define an undistorted representation thereof within said three-dimensional scene; and generate the image data describing the distorted representation of the at least one shape for use in graphics rendering of the three-dimensional scene, wherein said image data is lighting image data derived from said displayed two-dimensional canvas including said created/modified at least one two-dimensional shape, and said at least one two-dimensional shape is representative of a light source included in said lighting image data and for use in a graphical rendering process.

16. A computer program product comprising a non-transitory computer readable medium, having thereon computer program code, when the program code is loaded, to make the computer execute a method of generating data for use in image based lighting rendering according to claim 1.

17. A method of generating image data for use in image based lighting rendering, the method including:

displaying a user interface, separate from and communicably coupled to a displayed three-dimensional scene to be rendered in an image based lighting process, the user interface being in the form of a two-dimensional canvas representing an inner surface of a three-dimensional volume surrounding the three-dimensional scene to be rendered, each point on the two-dimensional canvas representing a surface coordinate of a three-dimensional scene to be rendered in the image based lighting rendering and corresponding to a longitude/latitude on said inner surface of said three-dimensional volume, said displayed two-dimensional canvas adapted to include at least one two-dimensional shape having an associated lightness value, said shape being distorted within said displayed two-dimensional canvas to define an undistorted representation thereof in said three-dimensional scene;

repeatedly receiving, via a computer, user input via interaction with said displayed two-dimensional canvas, said user input describing creation of the at least one two-dimensional shape having an associated lightness value or modification of said at least one two-dimensional shape within said displayed two-dimensional canvas; and substantially instantaneously updating the displayed two-dimensional canvas in accordance with each user input to display said two-dimensional canvas including said respective created/modified at least one two-dimensional shape distorted within said displayed two-dimensional canvas to define an undistorted representation thereof within said three-dimensional scene; and using the computer to generate the image data describing the distorted representation of the at least one two-dimensional shape for use in graphics rendering of the three-dimensional scene, wherein said image data is lighting image data derived from said displayed two-dimensional canvas including said created/modified at least one two-dimensional shape, and said at least one shape is representative of a light source included in said lighting image data and for use in a graphical rendering process.

* * * * *